July 23, 1946.  C. H. DUFFY  2,404,366

MASKING ATTACHMENT FOR PHOTOGRAPHIC CAMERAS

Filed Sept. 1, 1944

INVENTOR
CHARLES HUGH DUFFY
BY
ATTORNEY

Patented July 23, 1946

2,404,366

UNITED STATES PATENT OFFICE 2,404,366

MASKING ATTACHMENT FOR PHOTOGRAPHIC CAMERAS

Charles Hugh Duffy, Miami, Fla.

Application September 1, 1944, Serial No. 552,330

5 Claims. (Cl. 95—36)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (Ch. 460, 45 Stat. L. 467).

This invention relates to photography, and particularly to masking attachments for camera lenses.

It is known that when a portion of a camera lens is properly masked, a portion of the camera film or plate will not be exposed when light is permitted to pass through the lens, the extent of such unexposed portion of the film or plate depending upon the manner and extent of the masking of the lens. Various lens masking devices have been employed for the purpose of preventing exposure of a certain portion or portions of the camera film or plate upon normal exposure operation of the lens shutter.

Specifically, it is known that if a camera lens is properly masked on a vertical or horizontal line which passes through the lens, so that substantially one half of the lens is completely masked, substantially one half of the camera film or plate will be exposed upon normal exposure operation of the lens shutter, and that if the mask is then arranged to substantially mask the other half of the lens, that half of the camera film or plate which was not so exposed will be exposed upon a subsequent exposure operation of the camera shutter, while that half of the camera film or plate which was first exposed will not be again exposed upon such subsequent exposure operation of the camera shutter.

By such masking of first one half of a camera lens and then masking the other half, the camera film or plate is subjected to two independent exposures which may be of the same or of different subjects, and if the masking is properly done, and the times of exposures and light conditions are uniform, the two exposures blend together on the negative so produced as not to indicate to the observer that the same was made by two exposures, unless, of course, the camera was moved between the first and second exposures.

It is the purpose of this invention to provide a simple and inexpensive camera lens masking device for ready attachment to the barrel of a camera lens, whereby substantially each half of the camera lens may be successively masked and unmasked, and the invention consists in the means for automatically centering the attachment on the lens barrel; in the novel construction and arrangement of the pivoted masking element on such centering device to insure that the lens is masked and unmasked on a line passing substantially through the center of the lens, and in the novel means for effecting an operative attachment of the mask centering means to lens barrels of different diameters.

Referring to the accompanying drawing.

Like numerals of reference indicate the same parts throughout the several figures, in which.

Figure 1:
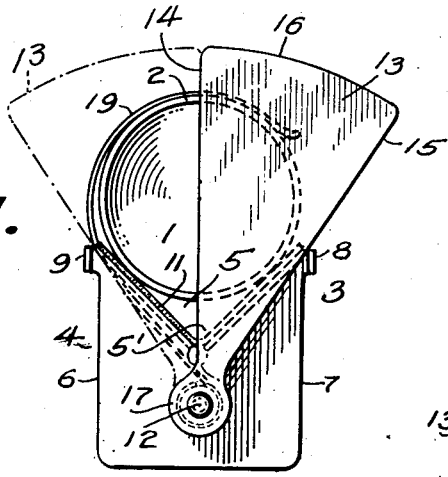
Figure 1 is a front elevation of the lens masking device shown centered in operative position on a lens barrel and lens and illustrating the lens mask in full lines in one masking position and in dotted lines in its other masking position.

1 indicates the lens and 2 the lens barrel of a camera supplied with the usual exposure shutter, not shown.

The masking attachment 3 includes the base plate 4, which is preferably a thin metal stamping or plastic molding having its top portion 5 cut away to form a V. The sides 6 and 7 of the base plate 4 are preferably parallel and are each provided with a small tang which is formed outwardly from the flat surface of the base plate to provide stops 8 and 9.

The material immediately adjacent the cutaway portion forming the V 5 is bent rearwardly from the front surface of the base plate 4 to provide a narrow flange 10, which, if desired may be surfaced with thin felt 11 for engagement with the lens barrel 2 to prevent marring the same.

Directly under and in vertical line with the apex 5' of the V 5 is a pin 12 which extends through and to both sides of the base plate 4 and is rigidly secured in position in any approved manner.

Figure 4:
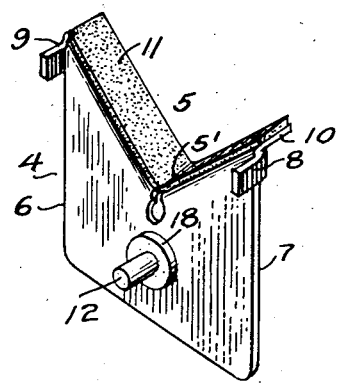
Figure 4 is a perspective view of the centering device.

The form and arrangement of the base plate 4 and its pin 12 as just described is best shown in Figure 4.

Referring to the masking element 13 of the device, it will be seen from Figure 1 that the sides 14 and 15 thereof are formed on lines radiating from the pin 12 considered as the center of a circle of which said sides 14 and 15 are radii and of which the outer edge 16 is an arc. The inner part of the masking element 13 terminates in a nearly circular portion 17 having therein a perforation to receive the pin 12, about which pin 12, the masking element 13 pivotally swings from the position shown in full lines to the position shown in dotted lines in Figure 1.

Figure 3:
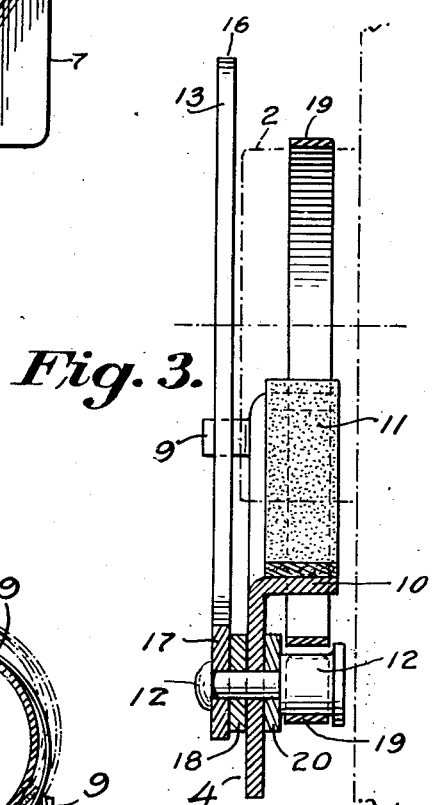
Figure 3 is a vertical sectional view.

The masking element 13 is retained on the pin 12 in any approved manner as by upsetting the end of the pin, and a thin spacing washer 18 may be interposed on the pin 12 between the masking element 13 and the base plate 4 as shown in Figures 3 and 4, to prevent rubbing contact between the masking element 13 and its centering device 4.

When the parts are thus assembled as described, the swing of the masking element is limited by the stops 8 and 9 on the base plate 4, so that when the masking element 13 is in position shown in full lines in Figure 1 and the side edge 15 thereof is engaged by the stop 8, its opposite side edge 14 is positioned in a plane passing substantially through the center of the lens 1, while when the masking element 13 is in position shown in dotted lines in Figure 1 and the side edge 14 thereof is engaged by the stop 9, its opposite side edge 15 is positioned in substantially the same said plane passing through the center of the lens 1. The result is that when the masking element 13 is in position shown in full lines in Figure 1 substantially, one half of the lens 1 is masked, while when the masking element 13 is in position shown in dotted lines in Figure 1 substantially, the other one half of the lens 1 is masked, the masking in each case extending from a line passing substantially through the center of the lens 1.

Figure 2:
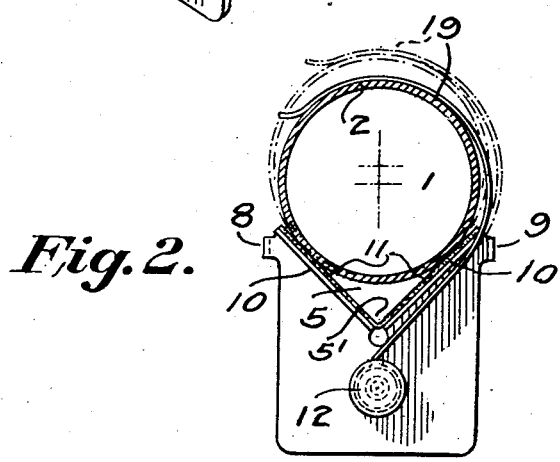
Figure 2 is a rear elevation of the same, with masking element removed.

Referring now to Figure 2, it will be seen that a curved leaf spring 19 is pivoted on the pin 12 on the inner side of the base plate 4 in the same manner as the masking element 13 is pivoted on said pin on the outer face of the base plate 4, said spring 19 being retained on the pin 12 in any approved manner, as by upsetting the end of the pin. Likewise a thin spacing washer 20 may be interposed on the pin 12 between the leaf spring 19 and the base plate 4, as shown in Figure 3 to prevent rubbing contact between the leaf spring 19 and the base plate 4.

As indicated by dotted lines in Figure 2, the flexibility of the leaf spring 20 permits the masking device to be readily attached and correctly centered on lens barrels of different diameters, so that the attachment is applicable to the lens barrels of cameras within a reasonable range of diameters, while the centering device 4 will always insure a correct centering of the masking device regardless of the diameter of the lens barrel to which the masking device is attached.

Having thus described the construction, its operation is as follows:

For photographing different subjects or the same subject in two different positions on the same negative, the camera should be mounted on a tripod or other suitable support which will insure the camera against movement. The masking device is then applied to the camera lens barrel by bringing the centering device 4 up, under and in contact with the lens barrel, and then passing the pivoted leaf spring 19 over the top surface of the lens barrel so that the masking element 13 is not in contact with the front edge of the lens barrel but is free to be swung in front of the lens. The masking element 13 being, for instance in position shown in full lines in Figure 1, the subject or subjects to be photographed are positioned in front of the camera and to the side of the center thereof which is in front of the unmasked half of the camera lens. While in this position the camera shutter is operated to effect the exposure, which results in exposing substantially one half of the camera film or plate. The masking element is then swung over into position shown in dotted lines in Figure 1, and the subject or subjects to be photographed are moved past the center line of the camera to a position in front of the now unmasked half of the camera lens which was just previously masked. While in this position the camera shutter is again operated to effect the second exposure, which results in exposing substantially the other half of the camera film or plate, and also results in masking substantially that half of the camera film which was exposed by the first exposure, so that no substantial part of the camera film or plate is subjected to a double exposure, but a blending together of the two exposures is effected. If the period of the two exposures are uniform and they are made one closely following the other so that the light conditions are the same for both, no discernible line of juncture of the two exposures will appear on the negative nor on the prints made therefrom.

In cases where the operator desires to photograph himself in two different positions on the same negative, the masking attachment is particularly adapted for use on cameras equipped with delayed action shutters.

It has been my purpose to reduce the masking attachment to its simplest form, and at the same time produce the most efficient device possible. It will be clearly apparent that no skill nor previous experience is necessary for effecting the attachment of the device in proper operative position to the lens barrel, since it is self centering and cannot possibly be attached thereto in an off-center position. It will be further noted that the center of gravity of the pivoted masking element is such that the masking element is held in proper and correct positions against its stops 8 and 9 by gravity so the masking element must of necessity come to rest in its proper masking position, when it is swung from one operative position to its other operative position.

It is in the construction, arrangement and combination of parts of the device which results in the simplicity and advantages mentioned that the invention consists.

I claim:

1. A device for masking the lens of photographic cameras which includes an attachment for centering the device on the lens barrel of a photographic lens, said centering attachment having one end cut away to provide a V-shaped formation, a flange formed at the V-shaped formation for engagement with the lens barrel of a photographic lens to correctly center the same on the lens barrel, a pin on the centering attachment extending outwardly on each side of the centering attachment, said pin being positioned on a line passing vertically through the apex of the V formation and bisecting the same, a leaf spring pivotally mounted on said pin on the rear side of the centering attachment for engaging the top surface of the lens barrel to retain the centering attachment in operative position thereon and a flat masking element pivotally mounted on the pin on the front side of the centering attachment, said masking element extending upwardly from its pivotal point and adapted to swing on its pivotal pin in front of a camera lens assembly to which it is attached, the two side edges of the pivoted masking element being formed substantially on radial lines of a circle of which the pivotal pin is the center and two stops on the centering attachment for limiting the movement of the masking element on its pivotal pin, each of said stops being located in such relation to the masking element as to position one edge of the masking element on a line passing substantially through the center of a camera lens when the masking element is in contact with one of said stops, and to position the other edge of the masking element on a line passing substantially through the center of the camera lens when the masking element is in contact with the other of said stops, whereby substantially each half of the lens may be successively masked and unmasked.

2. A device for masking the lens of photographic cameras which includes an attachment for centering the device on the lens barrel of a photographic lens, said centering attachment having one end cut away to provide a V-shaped formation, a flange at the V-shaped formation for engagement with the lens barrel of a photographic lens to correctly center the same on the lens barrel, a pin on the centering attachment extending outwardly on each side of the centering attachment, said pin being positioned under the V-shaped formation and disposed in a line passing through the apex and the center of the V-formation and bisecting the same, resilient means mounted on said pin on the rear side of the centering attachment for engaging the lens barrel to retain the centering attachment in operative position thereon, and a masking element sufficiently wide to mask substantially one half of a camera lens and pivotally mounted on said pin on the front side of the centering attachment, said masking attachment extending upwardly from its pivoted point and adapted to swing on its pivotal pin in front of a camera lens assembly to which it is attached, the two side edges of the pivoted masking element being formed substantially on radial lines of a circle of which the pivotal pin is the center, and stopping means on the centering attachment for limiting the movement of the masking element on its pivotal pin, said stopping means being located in such relation to the masking element so that when either one of the side edges of the masking element is in contact with a stop, the other one of its side edges is positioned on a line passing substantially through the center of a camera lens whereby substantially each half of the lens may be successively masked and unmasked.

3. A device for masking the lens of photographic cameras, which includes an attachment for centering the device on the lens barrel of a photographic lens, said centering attachment having one end cut away to provide a V-shaped formation for engagement with the lens barrel of a photographic lens to correctly center the same on the lens barrel, a pin on the centering attachment extending outwardly of the centering attachment, said pin being positioned under the V-shaped formation and disposed on a line passing through the apex and the center of the V-shaped formation and bisecting the same, resilient means mounted on the centering attachment for engaging the lens barrel to retain the centering attachment in operative position thereon, and a masking element sufficiently wide to mask substantially one half of a camera lens and pivotally mounted on said pin on the front side of the centering attachment, said masking attachment extending upwardly from its pivotal point and adapted to swing on its pivotal pin in front of a camera lens assembly when attached thereto, the two side edges of the pivoted masking element being formed substantially on radial lines of a circle of which the pivotal pin is the center, and stopping means on the centering attachment for limiting the movement of the masking element on its pivotal pin, said stops being located in such relation to the masking element so that when either one of the side edges of the masking element is in contact with its stopping means, the other one of its side edges is positioned on a line passing substantially through the center of a camera lens, whereby substantially each half of the lens may be successively masked and unmasked.

4. A device for masking the lens of photographic cameras, which includes an attachment for centering the device on the lens barrel of a photographic lens, said centering attachment having one end cut away to provide a V-shaped formation for engagement with the lens barrel of a photographic lens to correctly center the same on a lens barrel, means for retaining the centering attachment in engagement with a lens barrel, and a masking element pivotally mounted on the centering attachment, said masking element being sufficiently wide to mask substantially one half of a camera lens and extending upwardly from its pivotal point and adapted to swing in front of a camera lens assembly when attached thereto, the two side edges of the pivoted masking element being formed substantially on radial lines of a circle of which its pivotal point is the center, and stopping means on the centering attachment for limiting the movement of the masking element, said stopping means being located in such relation to the masking element so that when either one of the side edges of the masking element is in contact with a stopping means, the other one of its radial side edges is positioned on a line passing substantially through the center of a camera lens, whereby substantially each half of the lens may be successively masked and unmasked.

5. A device for masking the lens of photographic cameras, which includes an attachment adapted to engage the lens barrel of a photographic lens for centering the same thereon, said attachment having one end cut away to provide a V-shaped formation for engagement with the lens barrel of a photographic lens to correctly center the same on the lens barrel, means for retaining the centering attachment in engagement with a lens barrel and a masking element pivotally mounted on the centering attachment, said masking element being sufficiently wide to mask substantially one half of a camera lens, and adapted to swing on its pivot in front of a camera lens assembly when attached thereto, means for limiting the movement of the masking element to position the same in front of either half of a camera lens, whereby substantially each half of the camera lens may be successively masked and unmasked.

CHARLES HUGH DUFFY.